United States Patent [19]

Concilio et al.

[11] Patent Number: 5,241,661
[45] Date of Patent: Aug. 31, 1993

[54] DMA ACCESS ARBITRATION DEVICE IN WHICH CPU CAN ARBITRATE ON BEHALF OF ATTACHMENT HAVING NO ARBITER

[75] Inventors: Ian A. Concilio, Boca Raton, Fla.; Jeffrey A. Hawthorne, Atlanta, Ga.; Chester A. Heath, Boca Raton, Fla.; Jorge F. Lenta, Boca Raton, Fla.; Long D. Ngyuen, Boca Raton, Fla.

[73] Assignee: International Business Machines Corporation, Armonk, N.Y.

[21] Appl. No.: 912,229

[22] Filed: Jul. 10, 1992

Related U.S. Application Data

[63] Continuation of Ser. No. 780,558, Oct. 16, 1991, abandoned, which is a continuation of Ser. No. 30,788, Mar. 27, 1987, abandoned.

[51] Int. Cl.$^5$ .............................................. G06F 13/18
[52] U.S. Cl. ...................................... 395/275; 395/425
[58] Field of Search ................. 364/DIG. 1, DIG. 2; 340/825.5; 395/275, 425, 725

[56] References Cited

U.S. PATENT DOCUMENTS

| | | | |
|---|---|---|---|
| 3,638,198 | 1/1972 | Balogh, Jr. | 364/200 |
| 3,766,526 | 10/1973 | Buchanan | 340/172.5 |
| 3,925,766 | 12/1975 | Bardotti et al. | 340/172.5 |
| 4,090,238 | 5/1978 | Russo | 364/200 |
| 4,156,277 | 5/1979 | Seitz et al. | 364/200 |
| 4,245,300 | 1/1981 | Kaufman et al. | 364/200 |
| 4,257,095 | 3/1981 | Nadir | 395/325 |
| 4,262,357 | 4/1981 | Shima | 340/825.5 X |
| 4,296,466 | 10/1981 | Guyer et al. | 364/200 |
| 4,320,467 | 3/1982 | Glass | 364/900 |
| 4,371,932 | 2/1983 | Dinwiddie et al. | 364/200 |
| 4,400,771 | 8/1983 | Suzuki et al. | 364/200 |
| 4,419,728 | 12/1983 | Larson | 364/200 |
| 4,511,959 | 4/1985 | Nicolas et al. | 364/200 |
| 4,538,224 | 8/1985 | Peterson | 364/200 |
| 4,556,952 | 12/1985 | Brewer et al. | 364/900 |
| 4,584,703 | 4/1986 | Hallberg | 382/50 |
| 4,604,699 | 8/1986 | Borcherdt et al. | 364/420 |
| 4,611,297 | 9/1986 | Dudley et al. | 364/900 |
| 4,621,342 | 11/1986 | Capizzi et al. | 364/900 |
| 4,755,938 | 7/1988 | Takahashi et al. | 364/200 |
| 4,789,926 | 12/1988 | Clarke | 364/200 |

FOREIGN PATENT DOCUMENTS

| | | |
|---|---|---|
| 2039105 | 12/1979 | United Kingdom. |
| 2084768 | 7/1981 | United Kingdom. |
| 2186719 | 2/1987 | United Kingdom. |
| 8002608 | 11/1980 | World Int. Prop. O.. |

OTHER PUBLICATIONS

K. Zibert et al, Designing an Advanced DMA Controller for 16-Bit Microcomputers, Siemens Forsch, vol. 13, No. 5, 1984.
D. J. Schuelka, Master/Slave Cascade Channel for Microprocessor DMA, IBM Technical Disclosure Bulletin, vol. 22, No. 5, Oct. 1979.
C. J. Duggan, Low Performance Cycle Steel Priority, IBM Technical Disclosure Bulletin, vol. 18, No. 5, Oct. 1975.
G. T. Davis, Multiplexing of Interrupt and DMA Request Lines, IBM Technical Disclosure Bulletin, vol. 27, No. 5, Oct. 1984.
American National Standard, IEEE Standard 696 Interface Device, Jun. 13, 1983, New York.
Intel., 8237A/8237A-4/8237A-5 High Performance Programmable DMA Controller.
Jerry M. Rosenberg, *Dictionary of Computers, Information Processing and Telecommunications*, Second Edition, John Wiley and Sons, 1987, pp. 24 and 68.

Primary Examiner—Robert L. Richardson
Attorney, Agent, or Firm—Winfield J. Brown, Jr.; Stephen A. Terrile; Robert Lieber

[57] ABSTRACT

In a computer system having both peripherals having their own DMA channel arbiter and peripherals having no arbiter, a separate arbitration unit, controlled directly by the CPU, is provided to arbitrate on behalf of peripherals having no arbiter. The CPU can thus freely assign different arbitration levels to such peripherals, and can instruct the arbitration unit to simultaneously arbitrate on different arbitration levels or for two or more DMA channels.

12 Claims, 7 Drawing Sheets

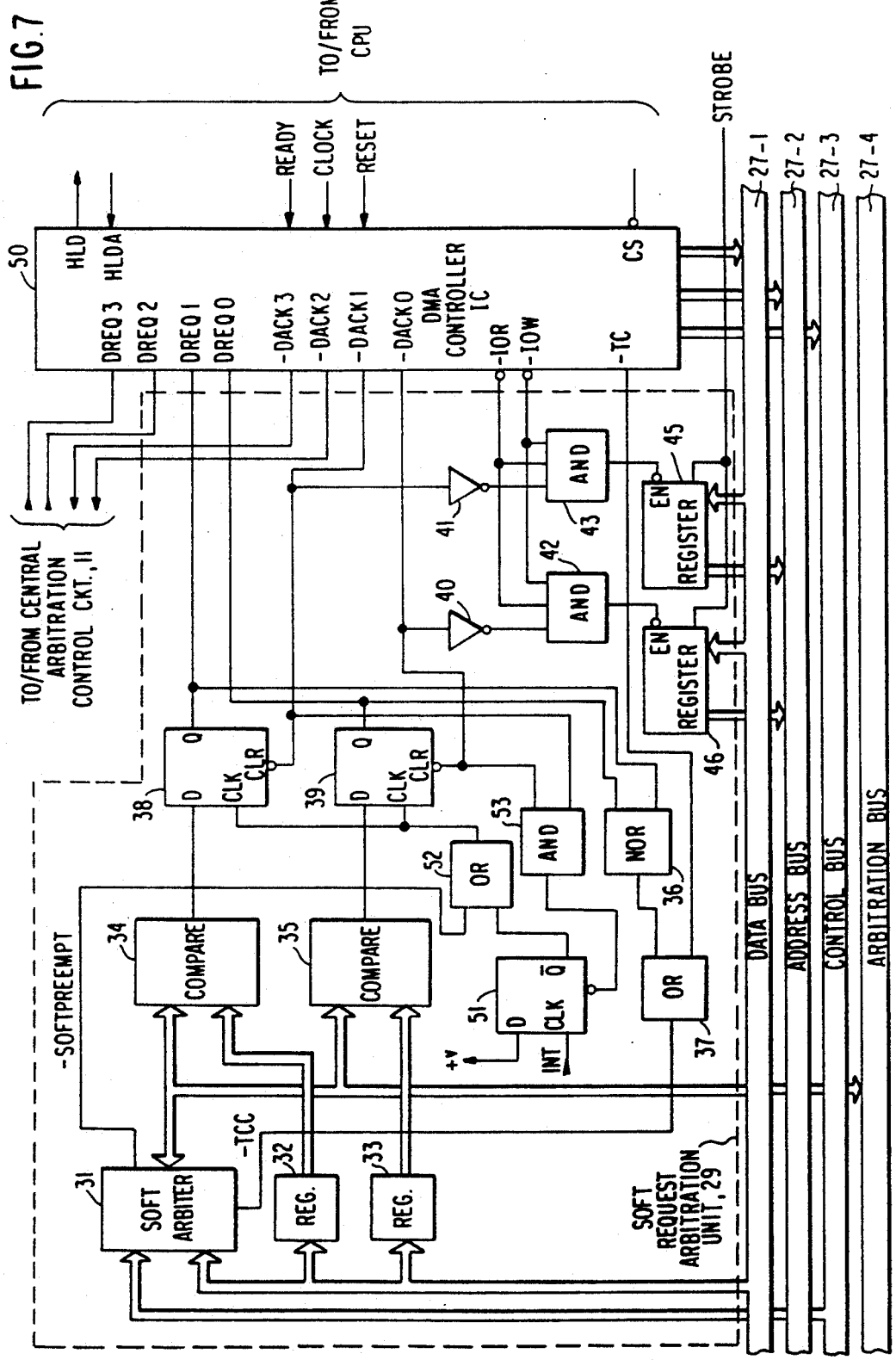

DMA ACCESS ARBITRATION DEVICE IN WHICH CPU CAN ARBITRATE ON BEHALF OF ATTACHMENT HAVING NO ARBITER

This is a continuation of co-pending application Ser. No. 07/780,558, now abandoned, filed on Oct. 16, 1991, which itself is a (file wrapper) continuation of original application Ser. No. 07/030,788 filed Mar. 27, 1987 (now abandoned).

DESCRIPTION

1. Technical Field

The present invention relates to a computer system having DMA (Direct Memory Access) available to peripheral units associated therewith, wherein both peripherals having their own arbitration circuit and peripherals having no arbitration circuit are able to obtain a DMA channel.

2. Background

Many present-day computer systems employ DMA channels to allow peripheral devices to transfer data, primarily to and from the main memory, without going through the CPU (Central Processing Unit). Bypassing the CPU of course has the advantage of increased data transfer rates and improved overall system efficiency because the CPU is free to perform other tasks during the data transfer.

The most common practice to date has been to provide one physical DMA channel for every peripheral unit that is allowed DMA access. An example of such a computer system is the IBM PC computer.

However, the number of peripheral devices which a user may attach to his or her computer system have been increasing and is expected to continue to do so. For instance, lately there have become available optical disk readers, additional communications devices, hard files, auxiliary memory devices, etc., all of which can make advantageous use of DMA access.

On the other hand, adding further physical DMA channels is costly of system hardware, including IC count, board space, and bus space. It has been considered to share DMA channels among peripheral devices with the restriction of mutually exclusive operation. Sharing of DMA channels is employed in, for instance, the IBM XT and AT computer systems. These schemes though require extensive modifications to the operating system as additional subroutines are required to prevent the peripheral devices associated with each DMA channel from operating simultaneously. A significant performance burden is also created when file controllers are not sufficiently "intelligent" to allow overlapped "seek" operations. The problem is compounded in certain situations, for example when a LAN (Local Area Network) feature and a file controller share the same DMA level and a "LAN file server" routine must trade back and forth between the two devices.

To overcome these problems, commonly assigned co-pending application Ser. No. 030,786, filed Mar. 27, 1987 (now U.S. Pat. No. 4,901,234), discloses a computer system employing peripherals which are each provided with an arbitration circuit. The arbitration circuits are interconnected with one another and with a central arbitration circuit via an arbitration bus. When one of the peripherals desires access to a DMA channel, it places on the arbitration bus its channel priority assignment. If its channel priority assignment has the highest priority, that peripheral is assigned an available DMA channel. In this manner, peripherals can be added to the system without having to provide addition DMA channels and DMA channel request lines.

However, sometimes it may be desired to use in such a computer system an existing peripheral that does not have an arbitration circuit. A peripheral not having an arbitration circuit cannot be added directly to that system since it has no way of requesting access to a DMA channel.

OBJECTS OF THE INVENTION

Accordingly, it is an object of the present invention to provide a computer system of the type in which peripherals request DMA access through the use of an arbitration bus, but which can also accommodate peripherals which do not have their own arbitration circuit.

PRIOR ART

U.S. Pat. No. 3,925,766 to Bardotti et al. discloses a computer system wherein peripheral devices are assigned priority levels, and requests for access to communicate with a memory are selected according to the priority levels. The priority level assignments can be changed according to the causes for which the request signals are generated or the particular load conditions of the central processor. No DMA paths are provided, however.

In U.S. Pat. No. 4,400,771 to Suzuki et al. there is shown a multi-processor system in which each of the multiple processors can access a single memory. A programmable register circuit stores priority information designating a memory access grade priority for each of the processors. The priority information can be changed manually, by an external circuit, or by at least one of the processors. The Suzuki et al. patent does not though employ DMA access to a memory from plural peripheral devices.

The following United States patents are mentioned for general background teachings related to computer systems employing DMA controllers: U.S. Pat. Nos. 4.371,932 to Dinwiddie, Jr., et al., 4,419,728 to Larson, 4,538,224 to Peterson, 4,556,962 to Brewer et al., and 4,584,703 to Hallberg.

SUMMARY OF THE INVENTION

In accordance with the present invention, both peripherals having their own arbitration circuits i.e., first means for arbitrating for access to a DMA channel, and peripherals having no arbitration circuit are connected to the same bus. Peripherals having their own arbitration circuit are allowed to arbitrate for access to the available DMA channels, by themselves, while a soft request arbiter i.e., second means for arbitrating for access to a DMA channel, is provided outside of the peripherals to arbitrate on behalf of peripherals having no arbitration circuit. The invention is also useful as a diagnostics tool to test the DMA channels during power-on tests and the like.

BRIEF DESCRIPTION OF THE DRAWINGS

FIG. 7 is a logic diagram of a soft request arbitration unit constructed in accordance with an alternate embodiment of the invention.

DETAILED DESCRIPTION OF THE PREFERRED EMBODIMENT OF THE INVENTION

Figure 1:
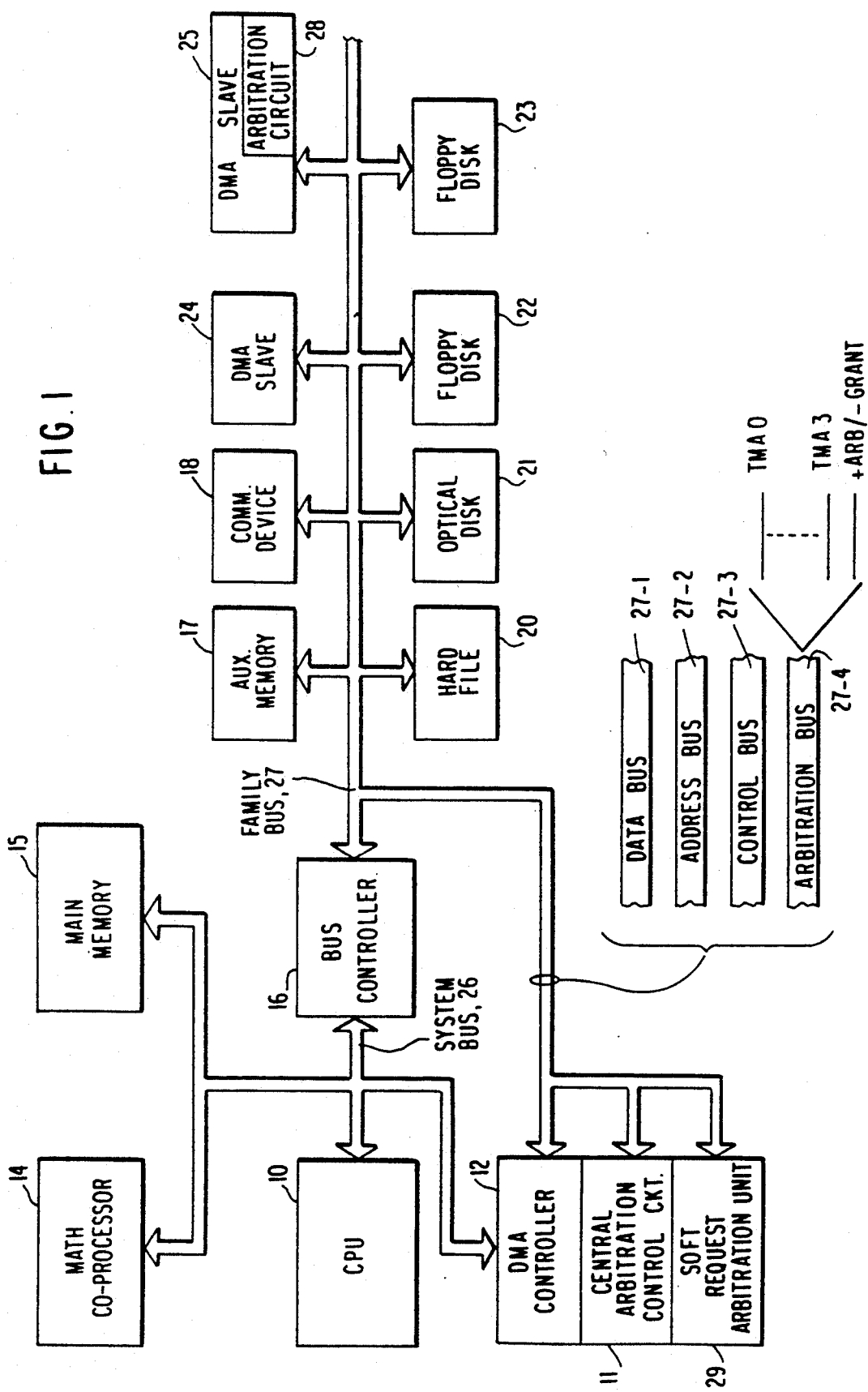
FIG. 1 is a block diagram of a computer system employing the present invention.

Referring first to FIG. 1 of the drawings, there is shown a block diagram of a computer system employing the invention.

A CPU 10 communicates over a system bus 26 with a main memory 15 and, optionally, a math co-processor. Various other units can be connected to the system bus 26 as requirements dictate. A "family" bus 27, to which various peripheral devices (sometimes termed merely "peripherals" or "attachments") are connected, is coupled to the system bus 26 via a bus controller. The arrangement thus far described is well known, an example being found in the IBM AT computer.

Many different types of peripherals can be connected to the family bus 27, the examples shown in FIG. 1 being an auxiliary memory 17, a communications device 18, a hard file 20, an optical disk 21, and two floppy disks 22 and 23. The family bus 27 is also routed to a DMA controller 12 and central arbitration circuit 11. As shown in the diagram in the lower part of FIG. 1, the family bus includes a data bus 27-1, an address bus 27-2, a control bus 27-3, and an arbitration bus 27-4.

In the computer system of the invention, some of the peripherals, represented generically by DMA slave 25, are provided with their own arbitration circuit 28. As mentioned briefly above, and as explained in detail in the above-referenced co-pending patent application, when a peripheral having an arbitration circuit 28 wishes the use of a DMA channel, the peripheral transmits its channel priority assignment onto the arbitration bus 27-4. At the end of a defined arbitration period, the value on the arbitration bus will be the channel priority assignment value having the highest priority among the peripherals concurrently requesting the use of a DMA channel. The central arbitration control circuit 11 then informs the DMA controller which DMA channel is to be assigned to the winning peripheral.

In accordance with the invention, however, peripherals not having their own arbitration circuit, represented by DMA slave 24, can also request and be granted the use of a DMA channel. The manner in which this is done will now be explained in detail.

To allow DMA access to peripherals not having their own arbitration circuit 28, a "soft request" arbitration unit 29 is provided. The purpose of the soft request arbitration unit 29 is to arbitrate, under instructions received from the CPU, on behalf of peripherals not having their own arbitration circuit 28. In this manner, existing peripherals can be mixed on the same bus with peripherals having their own arbitration circuit 28.

Figure 2:
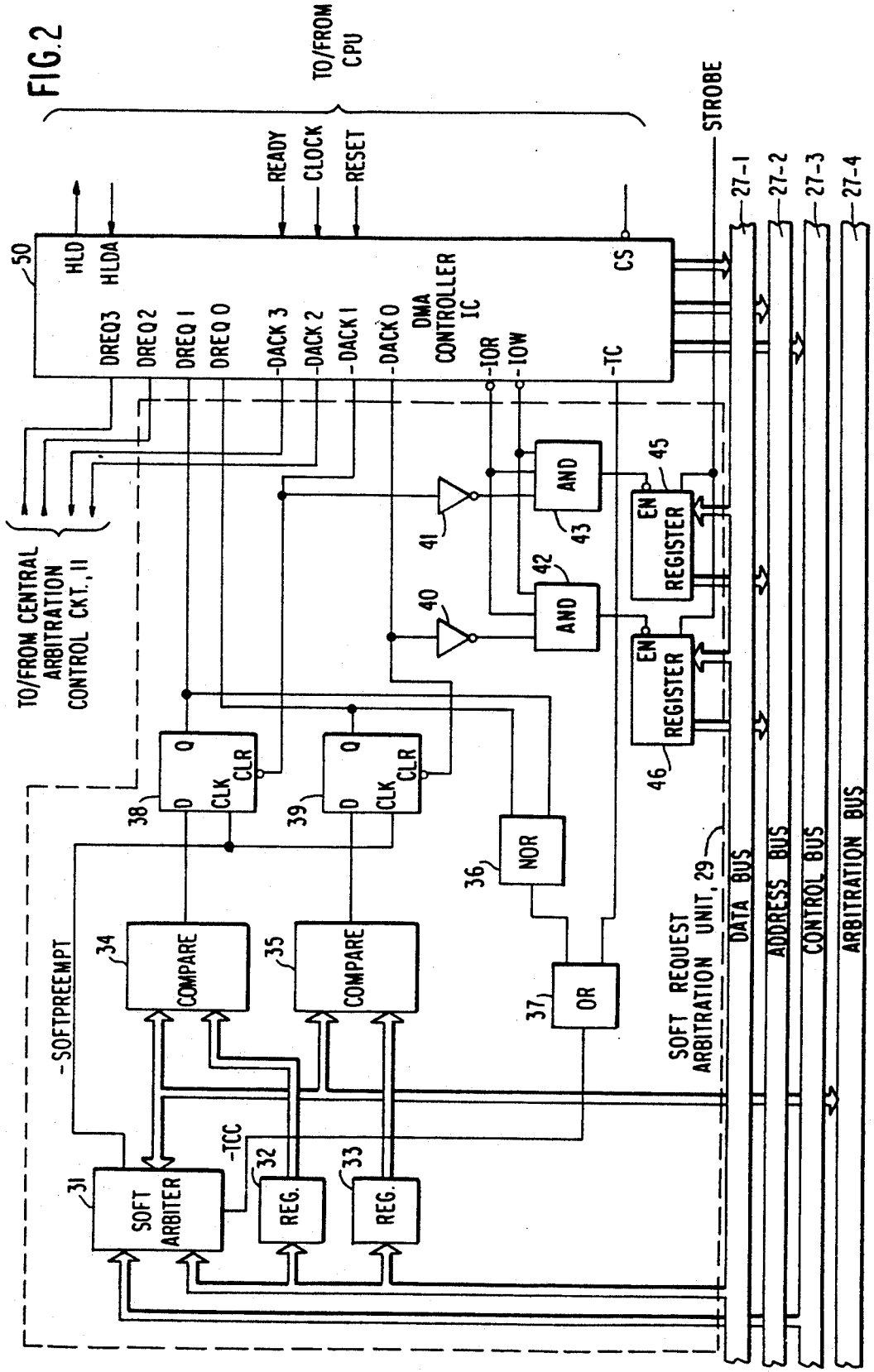
FIG. 2 is a logic diagram of a soft request arbitration unit used in the computer system of FIG. 1.

FIG. 2 shows the details of the soft request arbitration circuit 29 and its connections to the DMA controller 12 and the central arbitration control circuit 11. Inputs to a soft arbiter 31 and two registers 32 and 33 are supplied from the data bus 27-1. The soft arbiter 31 is also coupled to the arbitration bus 27-4. Certain control signals from the control bus 27-3 are also applied to the soft arbiter 31. Two comparators 34 and 35 each also have one input port coupled to the arbitration bus. The second input ports of the comparators 34 and 35 receive the outputs of the registers 32 and 33, respectively. The outputs of the comparators are connected to the D inputs of respective flip-flops 38 and 39, the clock inputs of which are supplied by a signal $-$SOFTPREEMPT (the "$-$" sign indicating a low truth signal, i.e., a signal having as its active state a logical "0") from the soft arbiter 31. The Q outputs of the flip-flops 38 and 39 are connected to the DMA channel request inputs DREQ1 and DREQ0 of a DMA controller IC 50. The flip-flops 38 and 39 are cleared by respective acknowledge signals $-$DACK1 and $-$DACK0. The DMA controller IC 50 generates a signal $-$TC (Terminal Count) which indicates when the final data transfer operation on any channel has been completed. To reset the soft arbiter 31 when the requested number of data transfer operations has been completed for its two channels, the signal $-$TC is gated by the outputs of the comparators 34 and 35 using a NOR gate 36 and an OR gate 37 to produce the signal $-$TCC. Thus, $-$TCC becomes active in the presence of a pulse of $-$TC when there is an active DMA request on either of the two channels with which the soft arbiter 30 is associated.

It is assumed that the DMA controller IC is an Intel Corporation type 8237 programmable DMA controller. In this case, the CPU may be any of the Intel iAPX 86 series of microprocessors, such as the 8088, 8086 or 80286. For details of the interconnections between the DMA controller IC and the CPU, reference may be made to the 1985 Intel Microsystem Components Handbook, pages 2-57 to 2-71.

The $-$DACK0 and $-$DACK1 signals are applied through inverters to inputs of two AND gates 42 and 43, the other inputs of which are supplied by the signals $-$IOR and $-$IOW (Input-Output Read and Input-Output Write) from the DMA controller IC 50. The outputs of the AND gates are connected to the enable inputs EN of respective registers 45 and 46. A clocking signal STROBE from the CPU is applied to the clock inputs of the registers 45 and 46. The input ports of the registers 45 and 46 are connected to the data bus 27-1, and the output ports are connected to the address bus 27-2.

Figure 5:
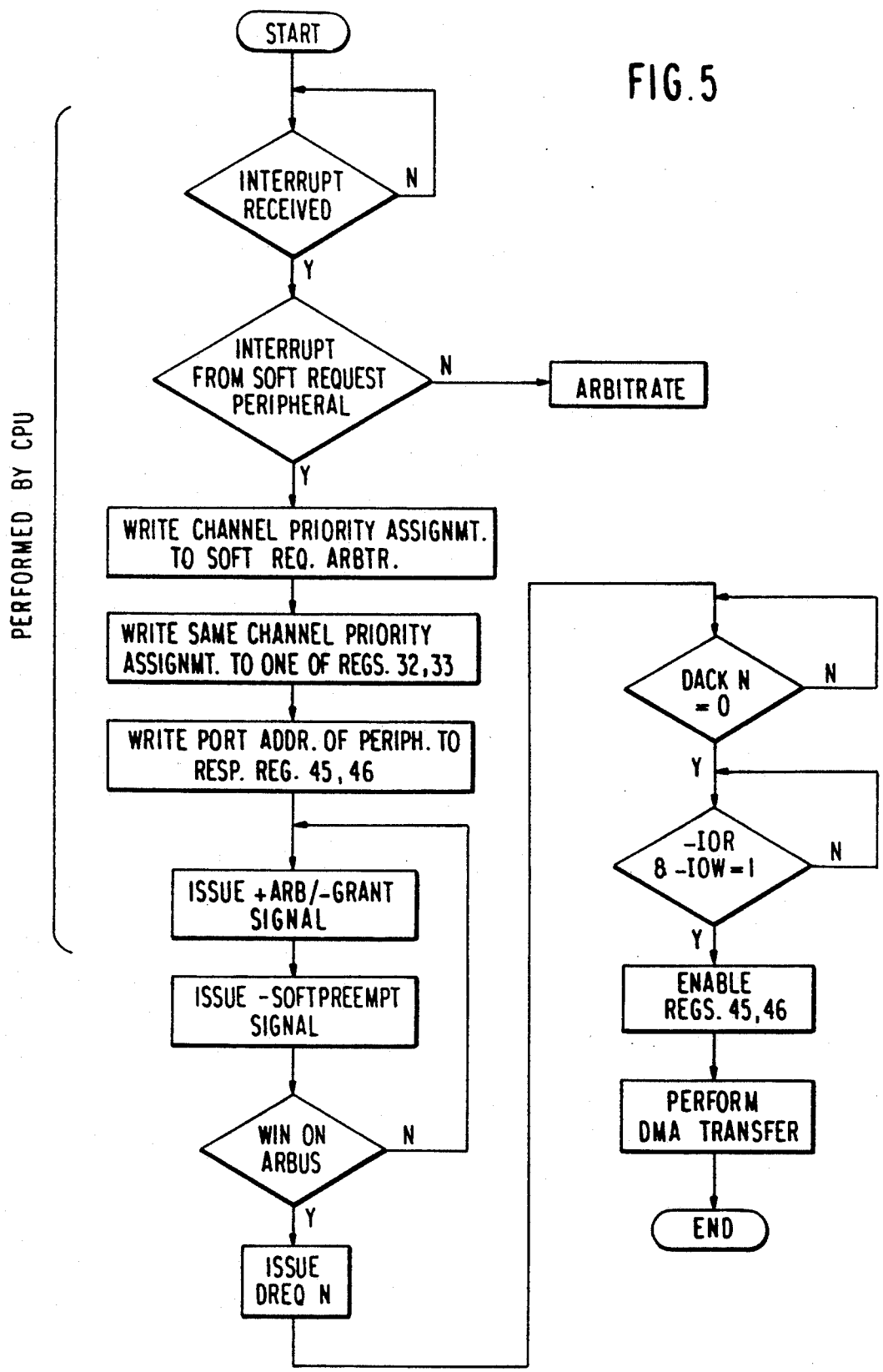
FIG. 5 is a flowchart showing operations of the CPU in initiating a request for a "soft" arbitration.

The operation of the soft arbitration unit 29 will now be explained in detail with reference to the flowchart of FIG. 5.

The CPU waits for an interrupt signal to be received from one of the peripherals, indicating a request for the use of a DMA channel. If the request is from one of the peripherals having its own arbitration circuit 28, arbitration and DMA channel acquisition are carried out in the manner described in the co-pending application. On the other hand, if the request is from one of the peripherals not having its own arbitration circuit 28, that is, if the peripheral making the request is one of the "soft request" peripherals, a channel priority assignment, corresponding in function to the channel priority assignments for peripherals having their own arbitration circuit 28, is sent to the soft arbiter 31. The same channel priority assignment value is written to one of the registers 32 and 33, the one chosen being dependent upon the DMA channel to be assigned to the peripheral should it "win" the subsequent arbitration among peripherals for an assignment.

In the present example, two registers 32 and 33, two flip-flops 38 and 39, two registers 45 and 46, etc., are provided to (1) allow arbitration to take place simultaneously between two different peripherals having no arbitration circuit (in which case the above steps should of course be repeated for the second peripheral), and (2) allow a choice for DMA channel assignment for soft request peripherals between two different DMA channels, channels 1 and 0, respectively. (the channels corresponding to DREQ1 and DREQ0 on the DMA controller IC 50). Of course, other numbers of these devices may be employed depending upon the number soft request peripherals accommodated concurrently and the number of DMA channels to be made available to the soft request peripherals.

Further, the port address of the requesting peripheral is written to the one of the registers 45 and 46 corresponding to the selected DMA channel, (channels 1 and 0, respectively). A signal +ARB/−GRANT on the arbitration control bus is then issued to the soft arbiter 31. (This will be explained in detail below with reference to FIGS. 3 and 4.) Arbitration among peripherals, both those with their own arbitration circuits and those without, then takes place on the arbitration bus 27-4.

After sufficient time has passed to allow the arbitration process to be completed, a signal −SOFTPREEMPT from the soft arbiter 31 undergoes a transition to the "1" state. If a soft request peripheral has won the arbitration, a "1" will appear at the output of one of the comparators 34 and 35, and a "1" is then clocked into one of the flip-flops 38 and 39. This activates one of the DMA channel request lines DREQ0 or DREQ1 to the DMA controller IC 50. The request will be acknowledged by the DMA controller IC 50 by setting the corresponding one of its acknowledge lines −DACK0 and −DACK1 in the "0" state. When the signals −IOR and −IOW are in the "1" state, indicating that DMA input/output access is now allowed, the respective one of the registers 46 and 47 is enabled to place the peripheral port address stored therein on the address bus 27-2. A DMA data transfer then is effected in a manner well-known in the art.

Figure 3:
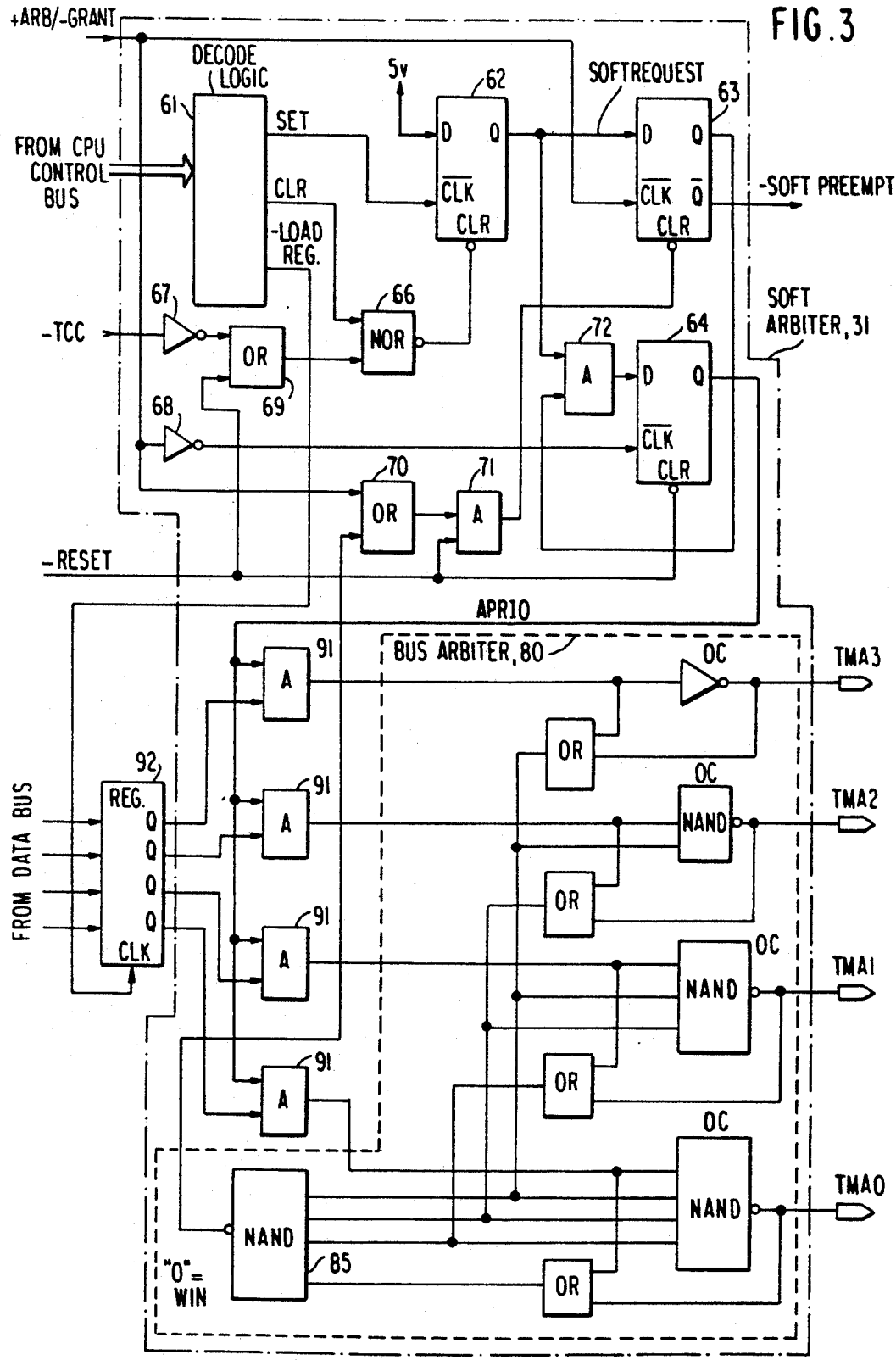
FIG. 3 is a logic diagram of a soft arbiter circuit employed in the soft request arbitration unit of FIG. 2.
Figure 4:
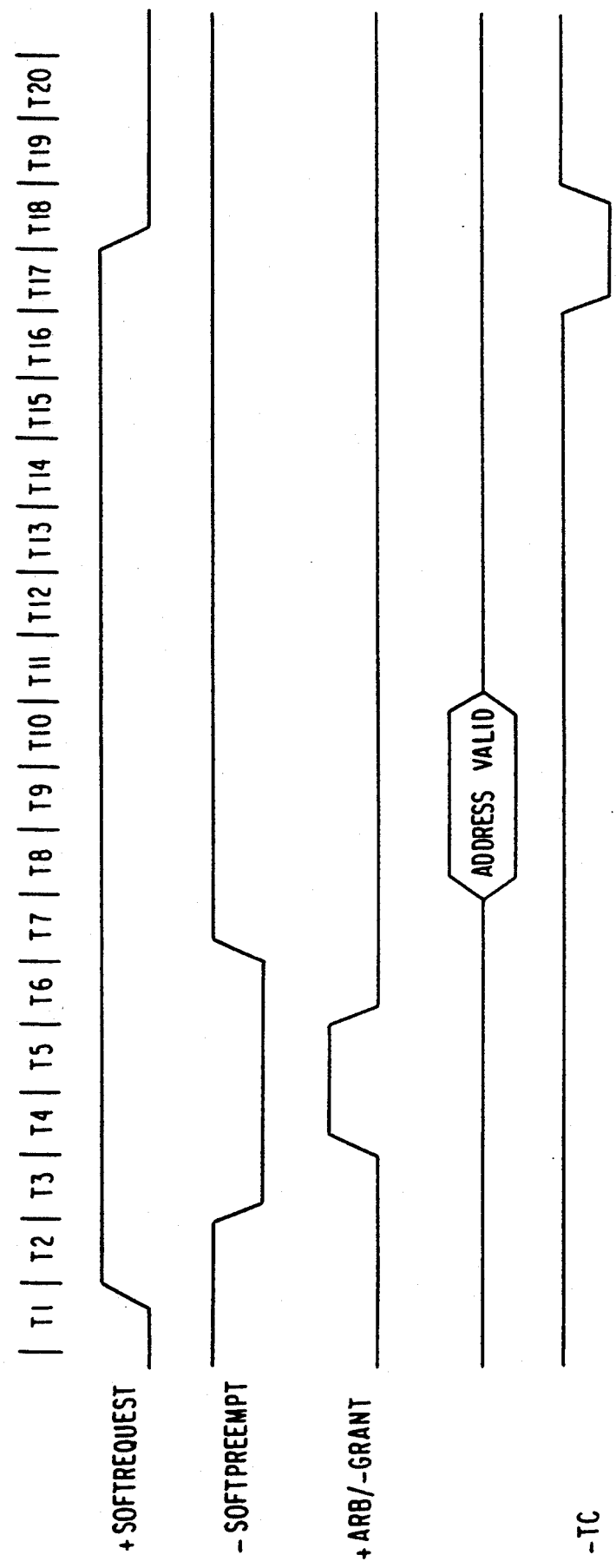
FIG. 4 is a waveform diagram showing some of the signals in the circuit of FIG. 3 and used to explain the operation of the circuit of FIG. 3.

FIG. 3 is a logic diagram of the soft arbiter 31.

The channel priority assignment is written in the register 92 when a decode logic 61 detects the respective address. This operation is achieved using an ordinary port addressing scheme. With the register 92 loaded with the channel priority assignment, when the CPU sends an instruction to the decode logic 61 that a soft request arbitration cycle is to take place, a SET signal is produced by the decode logic 61 which clocks a flip-flop 62, resulting in the signal +SOFTREQUEST being set to the active state. (See FIG. 4.) When a subsequent pulse of the arbitration period marking signal +ARB/−GRANT is received, a flip-flop 63 is clocked, issuing the signal −SOFTPREEMPT. Also, the output of a flip-flop 64 is then clocked high, activating the signal APRIO which causes the bus arbiter 80 to place the channel priority assignment on the arbitration bus.

Arbitration for the arbitration bus takes place when +ARB/−GRANT is active. At the end of the arbitration period +ARB/−GRANT returns to the low state. If the arbitration bus has been won, the output of a NAND gate 85 in the bus arbiter 80 goes low, resetting the flip-flop 63 (via an OR gate 70 and AND gate 71).

hence returning −SOFTPREEMPT to its inactive (high) state. This transition clocks the flip-flops 38 and 39, sending a request signal to the DMA controller IC 50. the signal APRIO is held high (to keep the channel priority assignment on the arbitration bus) since both inputs to an AND gate 72 are high, placing a high level on the input of the flip-flop 64. The peripheral's address is subsequently placed on the address bus 27-2 in the manner already described. When the data transfer has been completed. −TC appears, causing the generation of a pulse of −TCC. The flip-flop 62 is then reset (via an inverter 67, OR gate 69 and NOR gate 66). deactivating the +SOFTREQUEST signal.

The bus arbiter 80, which performs the actual arbitration operation on the arbitration bus 27-4, is a circuit as disclosed and discussed in detail in American National Standard/IEEE Standard No. ANSI/IEEE Std 696-1983, published by the Institute of Electrical and Electronics Engineers. Inc., Jun. 13, 1983. In general, each device incorporated in the arbitration scheme is provided with such a circuit, and the circuits are connected together via an arbitration bus. The arbitration bus in the example shown has four data lines TMA0-TMA3, allowing for 16 different arbitration levels. Any desired number though can be used. During a designated arbitration time period, all devices desiring to gain control over the bus transmit their arbitration levels onto the bus. This occurs when the signal APRIO goes to the "1" state. That is, in the present instance, the value then held in the register 92 (the channel assignment priority value, which is the arbitration level for the device) is gated through the AND gates 91 to the bus arbiter 80, and thence onto the arbitration bus lines TMA0-TMA3. At the end of the arbitration period, the value on the lines TMA0-TMA3 will be the value of the arbitration level of the device having the highest level.

Besides providing the computer system with a way of accommodating peripherals not having their own arbitration circuit, the invention is also quite useful as a diagnostics tool.

In accordance with this aspect of the invention, during a diagnostics routine, such as is ordinarily performed at the power-on time, for instance, each DMA channel is tested in sequence. That is, the soft request DMA routine explained above is carried out in sequence for each channel.

Figure 6:
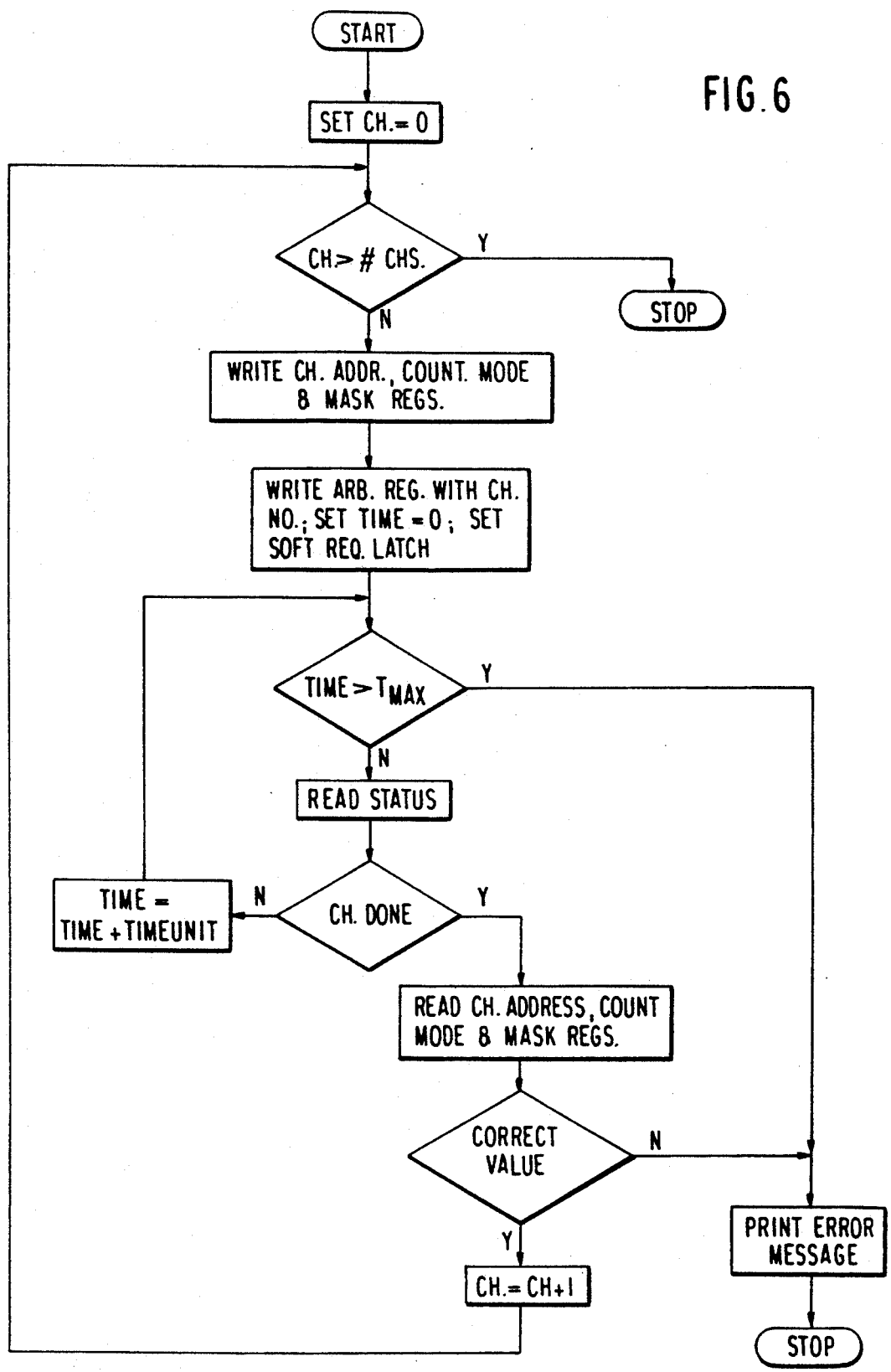
FIG. 6 is a flowchart showing steps in a diagnostic routine in which the present invention is used to advantage.

An example of such a diagnostics routine employing the invention will be explained with reference to the flowchart of FIG. 6.

To test all DMA channels in sequence, the channel number is first set to 0. Since the channel number is less than the total number of DMA channels provided in the system, the channel address, count, mode and mask registers are written to. Next, the arbitration value register, namely, the register 92 shown in FIG. 3, is written to with the channel number, a time counter is set to 0, and control signals are sent to the decode logic 61 of the soft arbiter 31 to cause the +SOFTREQUEST signal to go to the "1" state, thereby to trigger a soft request arbitration cycle. If the time counter has not exceeded a maximum time $T_{max}$, the current status is read from the status register of the DMA controller IC. When the arbitration cycle has been completed, the channel address, count, mode and mask registers are read. If they contain the correct values, it is determined that the channel is operating properly, and the next channel is tested in the same manner. If not, an error message is displayed. An error message is also displayed if the time counter exceeds $T_{max}$ before being able to read the correct information from the various registers.

An alternate embodiment of the invention will be described with reference to FIG. 7.

Different peripherals can transfer (receive and transmit) data at different maximum rates. If a peripherals maximum data transfer rate is slower than what the DMA channel is capable of, it could occur that a peripheral associated with the soft request arbitration unit would be overrun with incoming data. To prevent this from occurring, in accordance with the alternate embodiment of the invention, the interval between allowed soft request arbitration cycles is controlled in such a manner that the peripheral is never overrun with data.

In the embodiment depicted in FIG. 7, this is done by throttling the −SOFTPREEMPT signal so that DMA requests can be generated only at a predetermined maximum rate. For this purpose, an interrupt signal INT is generated at an interval corresponding to the desired maximum DMA request rate. When the signal INT is received, it clocks a flip-flop 51. The output of the flip-flop 52 gates the −SOFTPREEMPT signal on and off via an OR gate 52. After a soft request cycle has been completed, the flip-flop 51 is reset by one of the acknowledge signals −DACK0 and −DACK1 via an AND gate 53. No further soft request cycles are permitted until the signal INT again appears.

It is to be understood that while modifications can be made to the structures and teachings of the present invention as described above, such modifications fall within the spirit and scope of the present invention as specified in the claims appended hereto.

Having thus described our described, what we claim as new, and desired to secure by Letters Patent is:

1. A computer system containing at least one DMA channel comprising:
   a plurality of peripheral units, at least one of said peripheral units containing first means for arbitrating for access to a said DMA channel and at least one other one of said peripheral units not containing such first arbitration means; and
   second means external to said peripheral units for arbitrating for access to said DMA channel on behalf of said at least one peripheral unit not containing its own first arbitration means.

2. The computer system of claim 1, further comprising a central processing unit, said second means for arbitrating comprising means for arbitrating for a DMA channel in response to an instruction received from said central processing unit.

3. The computer system of claim 2, further comprising an arbitration bus interconnecting all said first and second means for arbitrating, and wherein each of said first and second means for arbitrating comprises means for placing on said arbitration bus an arbitration priority value for a corresponding one of said peripherals.

4. The computer system of claim 3, further comprising means for storing in said second means for arbitrating an arbitration priority value transferred thereto from said central processing unit.

5. A computer system containing a memory and at least one DMA channel, comprising:
   a central processing unit;
   means for providing at least one DMA channel for directing transfers of data relative to said memory;
   an arbitration bus;
   a plurality of peripheral units, at least one of said peripheral units containing first means for arbitrating for access to a said DMA channel by placing on said arbitration bus an arbitration priority value assigned to the respective peripheral unit, and at least one other one of said peripheral units not containing such first means for arbitrating; and
   second means external to said peripheral units for arbitrating for access to a said DMA channel on behalf of said at least one peripheral unit not containing a said first arbitration means, said second means for arbitrating placing on said arbitration bus an arbitration value assigned thereto by said central processing unit.

6. The computer system of claim 5, wherein said second means for arbitrating comprises:
   at least one means for storing an arbitration value assigned by said central processing unit;
   at least one means for comparing a value residing on said arbitration bus at the end of an arbitration period with said arbitration value stored in said storing means; and
   means for instructing said DMA channel providing means to assign a DMA channel to said at least one of said peripheral units when said comparing means indicates that said value residing on said arbitration bus is equal to said arbitration value.

7. The computer system of claim 6, wherein a plurality of each of said storing means comprises means for storing a plurality of values, and said comparing means comprises means for comparing a plurality of values.

8. The computer system of claim 7, wherein different ones of said storing means are adapted for storing different values respectively for simultaneously arbitrating on behalf of a plurality of peripheral units not having their own arbitration means.

9. The computer system of claim 7, wherein different ones of said storing means store different values for simultaneously arbitrating for different arbitration levels for the same one of said peripherals.

10. The computer system of claim 6, further comprising a data bus and an address bus interconnecting said central processing unit and said peripheral units, and wherein said second arbitrating means further comprises at least one register, having an input port coupled to said data bus and an output port coupled to said address bus, for placing on said address bus an address indicative of said at least one peripheral unit when said DMA channel assigning means assigns a DMA channel to said at least one peripheral.

11. The computer system of claim 7, further comprising a data bus and an address bus interconnecting said central processing unit and said peripheral units, and wherein said second arbitrating means further comprises a plurality of registers, each of said registers having an input port coupled to said data bus and an output port coupled to said address bus, for placing on said address bus an address indicative of a one of said peripheral units being assigned a DMA channel by said DMA channel assigning means.

12. The computer system of claim 5, wherein said second means for arbitrating comprises means for establishing a predetermined minimum interval between arbitrations on behalf of said at least one peripheral unit without means for arbitrating whereby said at least one peripheral unit is prevented from being overrun by data transfer due to said means for providing one DMA channel being capable of having data transferred thereon at a rate greater than said at least one peripheral unit is capable of receiving.

* * * * *